United States Patent
Lin

(10) Patent No.: US 10,641,450 B2
(45) Date of Patent: May 5, 2020

(54) OPTICAL LIGHTING DEVICE OF VEHICLES

(71) Applicant: Shutter Precision Co., Ltd., Taichung (TW)

(72) Inventor: Po-Chou Lin, Taichung (TW)

(73) Assignee: SHUTTER PRECISION CO., LTD., Taichung (TW)

( * ) Notice: Subject to any disclaimer, the term of this patent is extended or adjusted under 35 U.S.C. 154(b) by 0 days.

(21) Appl. No.: 16/388,107

(22) Filed: Apr. 18, 2019

(65) Prior Publication Data
US 2019/0323671 A1  Oct. 24, 2019

(30) Foreign Application Priority Data
Apr. 18, 2018 (TW) ............... 107113177 A

(51) Int. Cl.
| | |
|---|---|
| *F21S 41/255* | (2018.01) |
| *F21S 41/143* | (2018.01) |
| *F21S 41/60* | (2018.01) |
| *G02B 19/00* | (2006.01) |
| *F21V 5/04* | (2006.01) |
| *G02B 13/08* | (2006.01) |
| *G02B 27/09* | (2006.01) |
| *F21Y 115/10* | (2016.01) |
| *F21Y 101/00* | (2016.01) |

(52) U.S. Cl.
CPC ........... *F21S 41/255* (2018.01); *F21S 41/143* (2018.01); *F21S 41/60* (2018.01); *F21V 5/04* (2013.01); *G02B 13/08* (2013.01); *G02B 19/0009* (2013.01); *G02B 27/0955* (2013.01); *F21Y 2101/00* (2013.01); *F21Y 2115/10* (2016.08)

(58) Field of Classification Search
CPC ........ F21S 41/143; F21S 41/255; F21S 41/60; F21V 5/04; F21Y 2115/10; F21Y 2101/00; G02B 13/08; G02B 19/0009; G02B 27/0955
See application file for complete search history.

(56) References Cited

U.S. PATENT DOCUMENTS

| | | | |
|---|---|---|---|
| 8,733,992 B2* | 5/2014 | Bushre ................... | B60Q 1/20 362/520 |
| 9,494,288 B2* | 11/2016 | Kobayashi ........... | B60Q 1/1423 |
| 9,982,864 B2* | 5/2018 | Fukui ................. | G02B 19/0061 |
| 10,114,279 B2* | 10/2018 | Lim ..................... | F21S 41/125 |
| 10,203,081 B2* | 2/2019 | Matsuda ................ | F21S 41/26 |
| 2010/0149801 A1 | 6/2010 | Lo et al. | |
| 2015/0330589 A1 | 11/2015 | Kloos | |
| 2019/0265468 A1* | 8/2019 | Hirata ............... | G02F 1/133615 |

* cited by examiner

*Primary Examiner* — Peggy A Neils
(74) *Attorney, Agent, or Firm* — Muncy, Geissler, Olds & Lowe, P.C.

(57) ABSTRACT

An optical lighting device includes an optical element having a light incident surface and a light emitting surface, wherein at least one first anamorphic asphere is deployed on either of the light incident surface or the light emitting surface. A first light source being square deployed on one side of the optical element and opposite to the light incident surface. The light source projects into the light incident surface, refracts by the first anamorphic asphere, transmits out of the light emitting surface and forms a predetermined light distribution area with a cut-off line on the upper fringe. Therefore, the optical lighting device has the advantage of simplified structure and high lighting efficiency.

6 Claims, 11 Drawing Sheets

OPTICAL LIGHTING DEVICE OF VEHICLES

BACKGROUND OF THE INVENTION

1. Field of the Invention

The present invention relates to an optical lighting device and the technical field applied thereof, and more particularly, to an optical lighting device for vehicles.

2. Description of the Related Art

The devise of bicycle lamps usually follows the protocols: firstly, the cut-off line should be no upside flood light and at proper height avoiding the beam dazzling the vision of the drivers and the pedestrians; secondly, the light distribution area should be wide enough as to cover the vision at front of both sides.

Generally, the formation of the cut-off line is formed by the emitting light which is refracted inside of the light cup deployed in front of the light source. However, after the light went through the progress of reflection and the diffusion, it generates energy consumption and lit deficiency.

US20100149801A1 discloses an optical lens and light emitting diode (LED) illuminating device thereof. The provisional application utilizes a Toric surface formula to contour the optical surface being axial symmetry in M shape with an concave inner and an convex outer. Having such special structure on the optical surface makes it difficult to produce.

U.S. patent application No. US2015/0330589 discloses a headlight for vehicles Wherein the optical unit comprises two lens element with different geometrical shapes to form a predetermined light distribution. Said provisional patent employs two different shapes of lens and adopts no light cup for headlight to meet the requirement which makes the structure more complicated.

SUMMARY OF THE INVENTION

The objective of present invention is provide a solution downsizing the optical elements and simplifying the structure at the same time.

The objective of present invention is provide an optical lighting device having one light source by one optical lens formation for generating a predetermined light distribution area by primary optical projection to achieve the performance of minimum elements and simplified configuration. The optical lighting device applied on vehicles, such as bicycle, complies with the regulation and utilization for vehicle lamps.

To achieve aforementioned goal and the performance, the present invention reveals an optical lighting device having a light incident surface and a light emitting surface, wherein at least either of the light incident surface or the light emitting surface forms a first anamorphic asphere. A first light source is positioned on one side of the optical element and opposite to the light incident surface, wherein the first light source projects a predetermined shape of light distribution area and forms a cut-off line on the upper fringe of the light distribution area after the light transmits out of the light emitting surface by the refraction of the first anamorphic asphere when the light directly projects into the light incident surface.

DETAILED DESCRIPTION OF PREFERRED EMBODIMENTS

Figure 1:
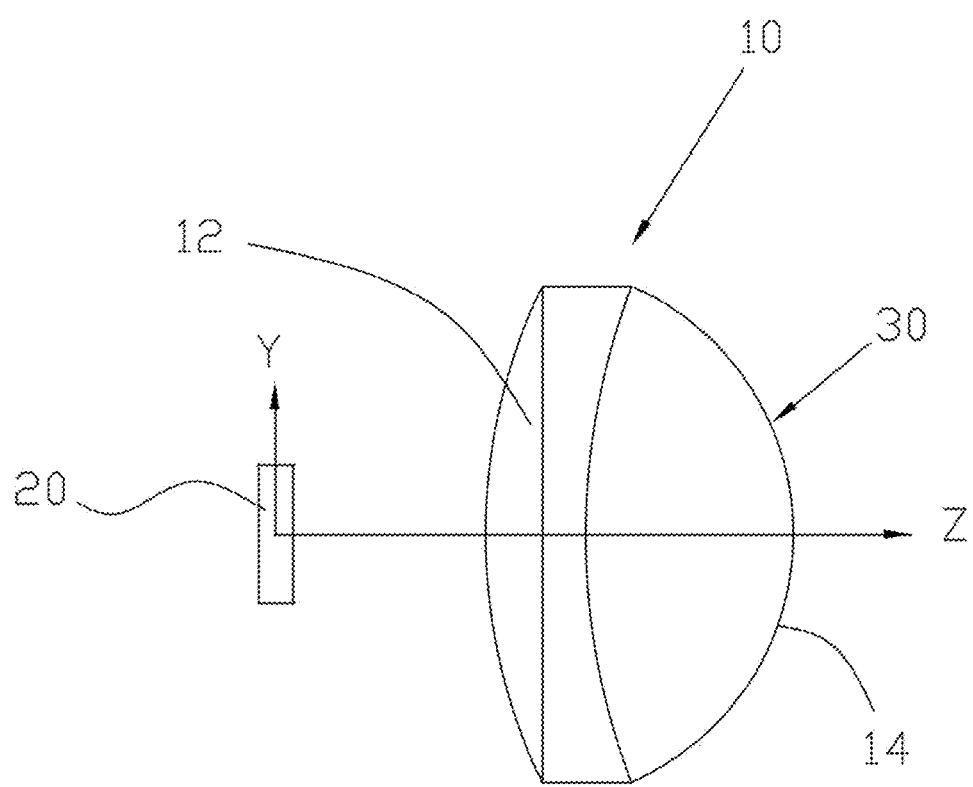
FIG. 1 is a schematic view that the optical element is opposite to the first light source.
Figure 2:
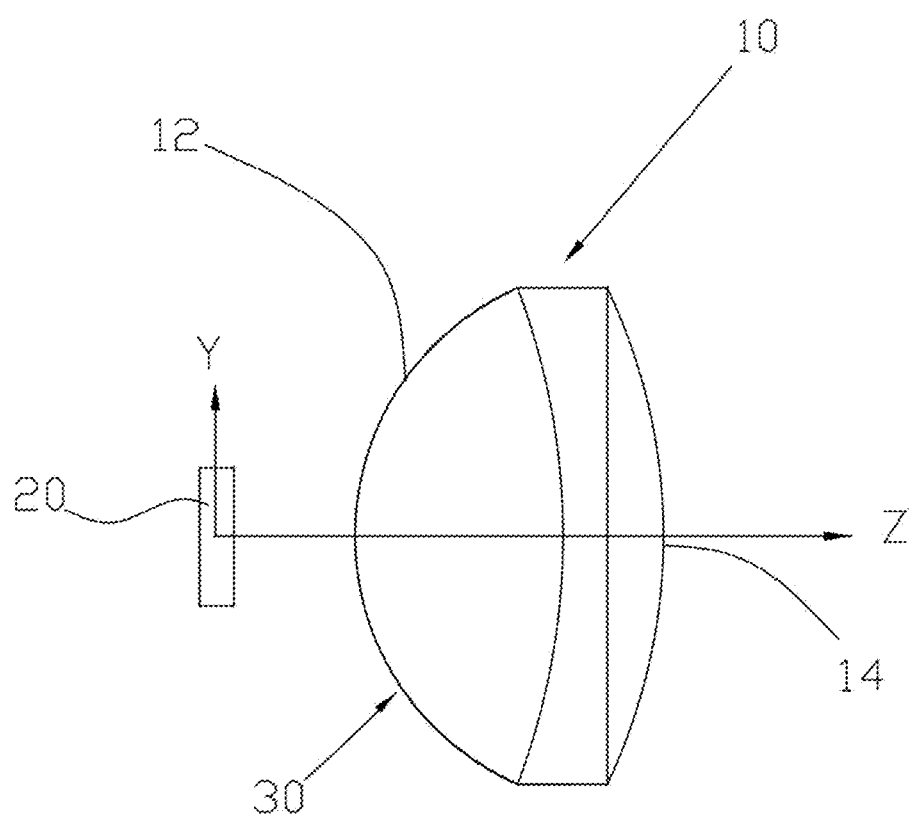
FIG. 2 is a schematic view that the optical element is opposite to the first light source.

As shown in FIGS. 1 and 2, an optical lighting device includes an optical element 10, and a first light source 20 opposite to the optical element 10. The optical element 10 is a lens configured with a light incident surface 12, and a light emitting surface 14 opposite to the light incident surface 12. The first light source 20 deployed on one side of the optical element 10 opposite to the light incident surface 12.

Noticeably, at least either of the light incident surface 12 or the light emitting surface 14 forms a first anamorphic asphere 30, and the first light source 20, square in shape, projects a beam into the light incident surface 12, a primary optical mode for beam directing into a lens, and transmits out of the light emitting surface 14; to be more specifically, the beam of the first light source refracts out from a first anamorphic asphere 30.

Figure 3:
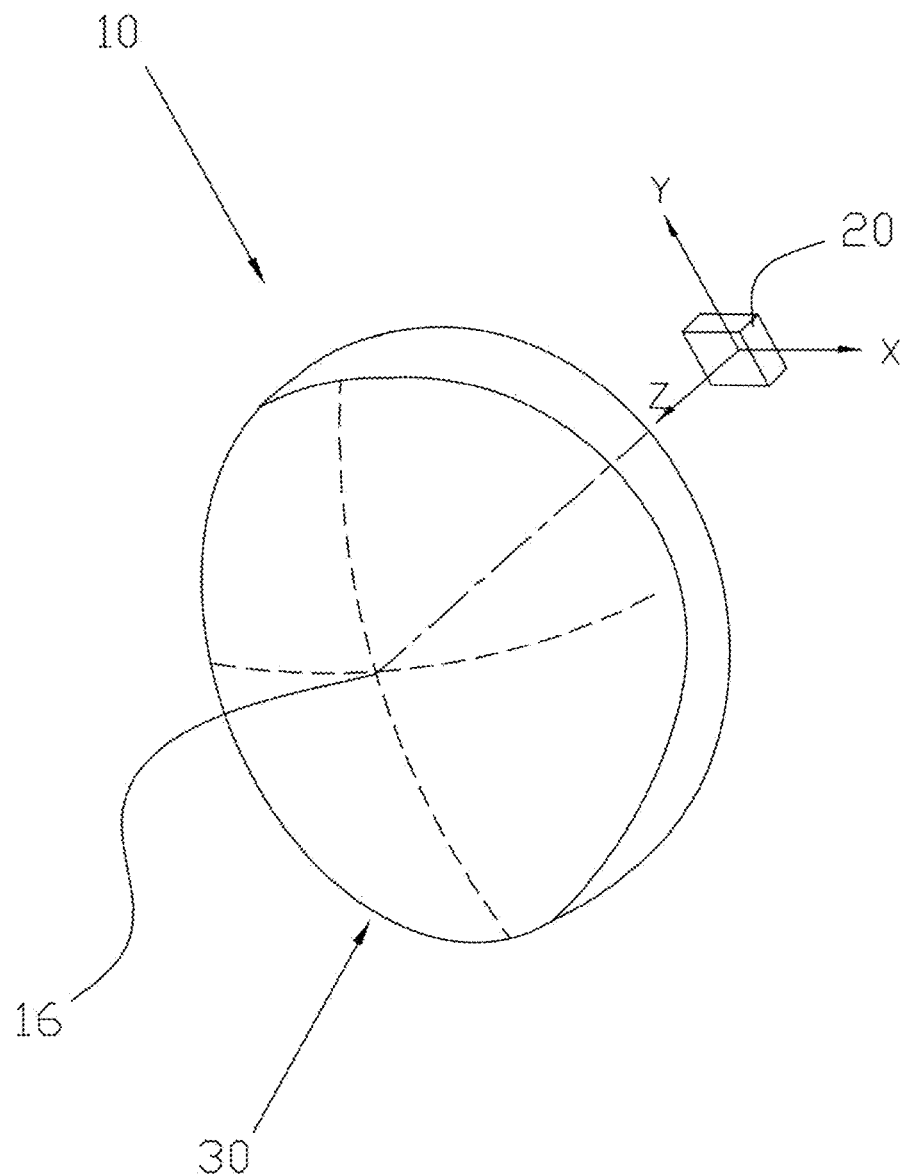
FIG. 3 is a perspective view that the optical element is opposite to the first light source.

As shown in FIG. 3, the first anamorphic sphere 30 is allowed to have a plurality aspherical condensers embodied in bilateral symmetry. The first anamorphic asphere 30 along with the relative X-Y-Z coordination satisfies the following formula:

$$z = \frac{c_x x^2 + c_y y^2}{1 + \sqrt{1 - (1 + k_x)c_x^2 x^2 - (1 + k_y)c_y^2 y^2}} + \sum_{n=2}^{10} A_{2n}[(1 - B_{2n})x^2 + (1 + B_{2n})y^2]^n$$

Wherein $A_{2n}$ is a symmetry coefficient, $B_{2n}$ is an asymmetry coefficient, $K_x, K_y$ are conic coefficients, and $C_x, C_y$ are curvatures Besides, the first light source 20 is directed to the center 16 of the optical element 10 and their relative positions are given as an example in the figure and should not be seen as to limit the spirit and scope of the present invention.

Figure 4:
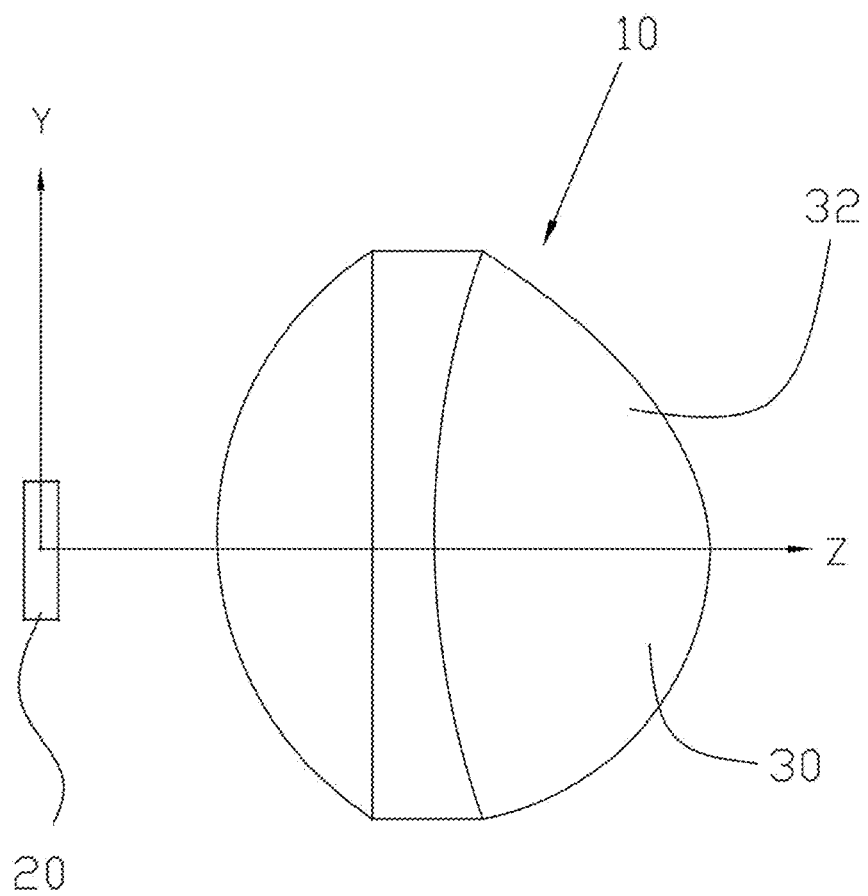
FIG. 4 is a schematic view that the optical element is opposite to the first light source.

In FIG. 4, the optical element 10 further includes a second anamorphic asphere 32 connected to the first anamorphic asphere 30, and the X-Y-Z coordination of the second anamorphic asphere 32 satisfies the following formula:

$$z = \frac{c'_x x^2 + c'_y y^2}{1 + \sqrt{1 - (1+k'_x)c'^2_x x^2 - (1+k'_y)c'^2_y y^2}} + \sum_{n=2}^{10} A'_{2n}[(1 - B'_{2n})x^2 + (1 + B'_{2n})y^2]^n$$

Wherein the $A'_{2n}$ is a symmetry coefficient, $B'_{2n}$ is asymmetry coefficient, $K'_x$, $K'_y$ are conic coefficients, and $C'_x$, $C'_y$ are curvatures.

Noticeably, the first anamorphic sphere 30 and the second anamorphic sphere 32 occupy the same X-Y-Z coordination, wherein the first anamorphic sphere facing to the Y≥0 direction, while the other anamorphic sphere facing to the Y≤0 direction, and at least one coefficient has different value for configuring the first anamorphic sphere 30 and the second anamorphic sphere 32 among the symmetry coefficients, the asymmetry coefficients and the conic coefficients, such as $A_{2n}=A'_{2n}; B_{2n}=B'_{2n}; C_x=C'_x; K_x=K'_x; C_y \neq C'_y; K_y \neq K'_y$.

Figure 5:
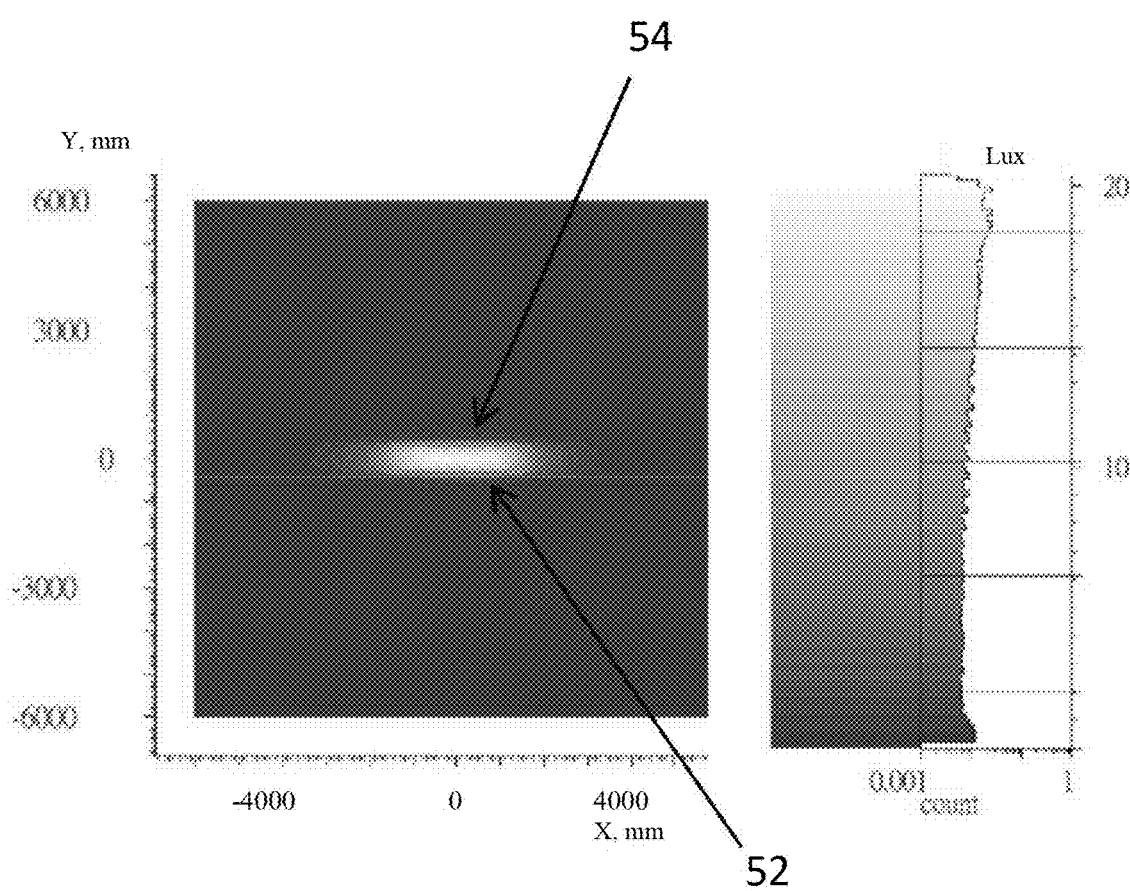
FIG. 5 is a drawing of a light distribution pattern when a light transmits out of the optical element by the projection of the first light source.

Noticeably, the first anamorphic sphere 30 and the second anamorphic sphere 32 occupy the same X-Y-Z coordination, wherein the first anamorphic sphere facing to the Y≥0 direction, while the other anamorphic sphere facing to the Y≤0 direction, and at least one coefficient has different value for configuring the first anamorphic sphere 30 and the second anamorphic sphere 32 among the symmetry coefficients, the asymmetry coefficients and the conic coefficients, such as $A_{2n}=A'_{2n}; B_{2n}=B'_{2n}; C_x=C'_x; K_x=K'_x; C_y \neq C'_y; K_y \neq K'_y$ FIG. 5 is a projection result by utilizing arrangement of the optical element 10 in an opposite position to a square light source (square LED) disclosed in aforementioned embodiment. A light distribution pattern 52 forms a wide spectrum area having a clear cut-off line 54 on its upper fringe as shown in the figure.

Because the first light source 20 is a square shape and is accordingly given either the first anamorphic asphere 30 or the second anamorphic asphere 32 for the beam projecting into and the generated result of the light distribution pattern 52 is enlarged in width having a cut-off line 54 of spontaneous reflection.

According to aforementioned embodiment, the present invention may be embodies as below.

Figure 6:
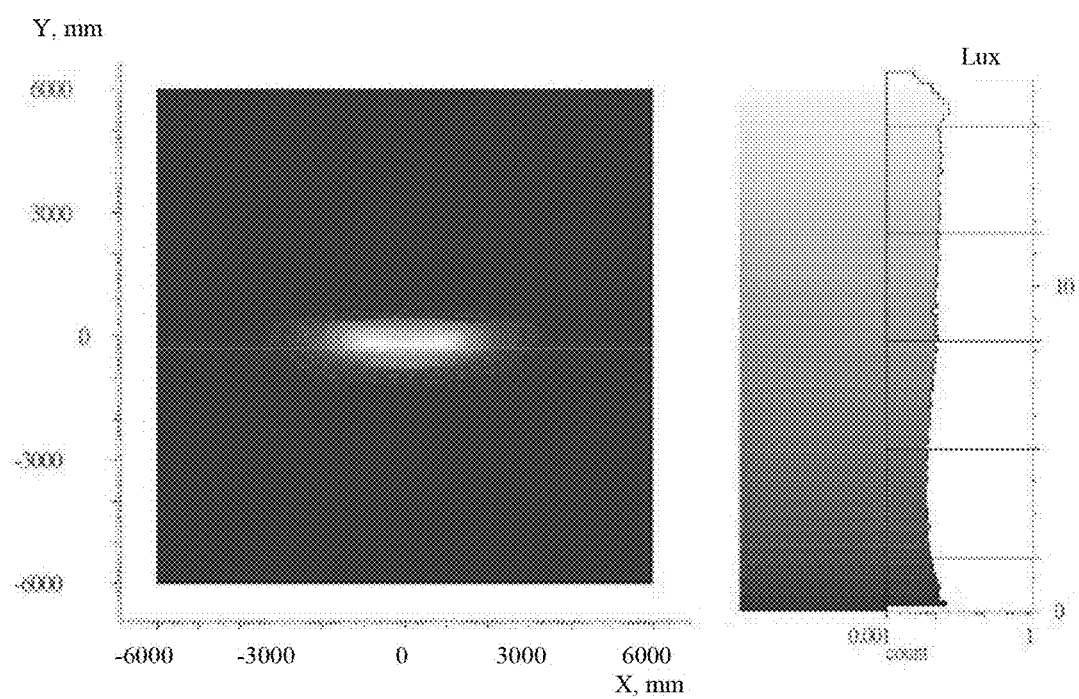
FIG. 6 is a drawing of light distribution pattern of which the optical element is configured with two anamorphic spheres.

In FIGS. 4 and 6, the optical element 10 comprises that the first anamorphic sphere 30 connected to the second anamorphic sphere 32 with a curvatures differs from the second one, therefore when the light refracts out from the optical element 10 illuminated by the first light source 20 form an exposure area with different shapes on its upper and lower fringes.

Figure 7:
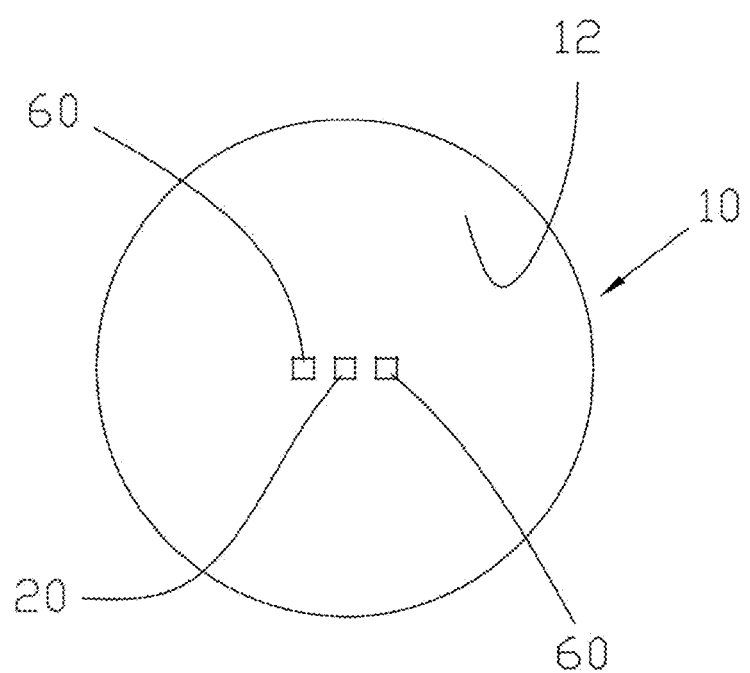
FIG. 7 is a schematic view of light arrangement that the first and the second light sources are opposite to the optical element.
Figure 8:
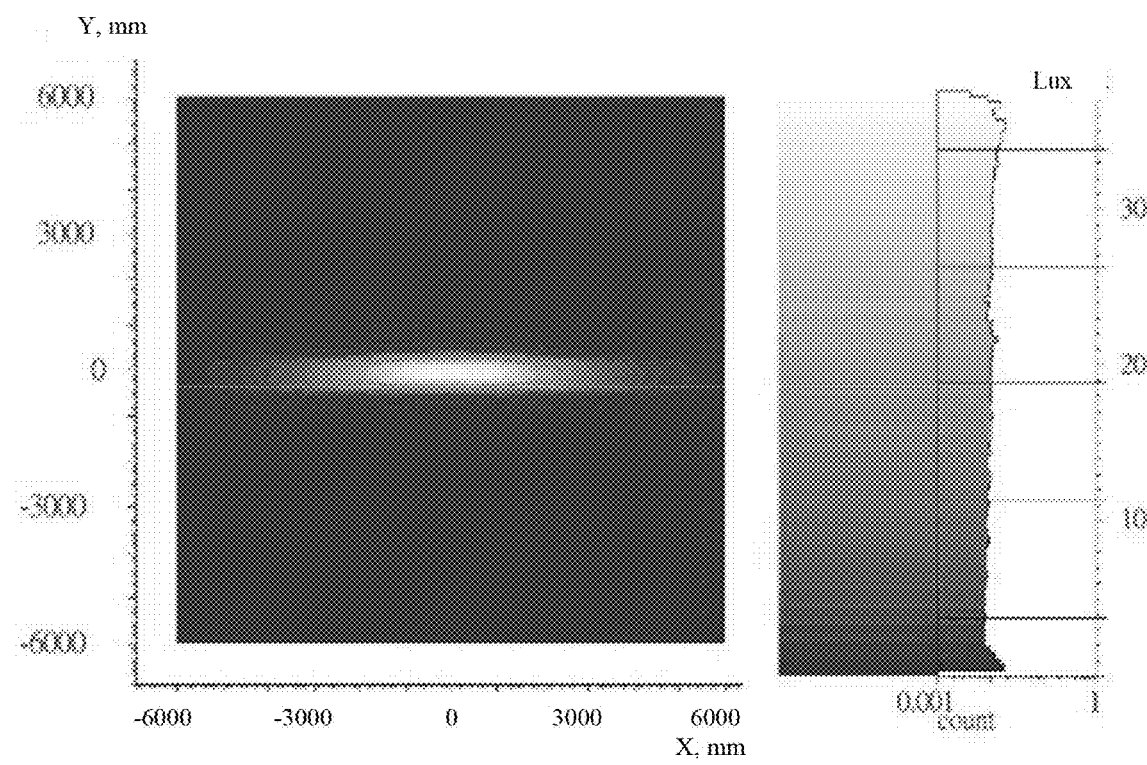
FIG. 8 is a drawing of light distribution pattern when a light transmits out of the optical element by the projection of the first and the second light sources.

In FIG. 7, the embodiment includes at least one second light source 60 deployed on either sides of the optical element 10 opposite to the light incident surface 12 and aligned to the first light source 20. FIG. 8 is a light distribution pattern of a beam refracting out from the optical element 10 under a projection of the light source 20 and the second light source 60 which is prevalently enlarge in width than it is in FIG. 8.

Figure 9:
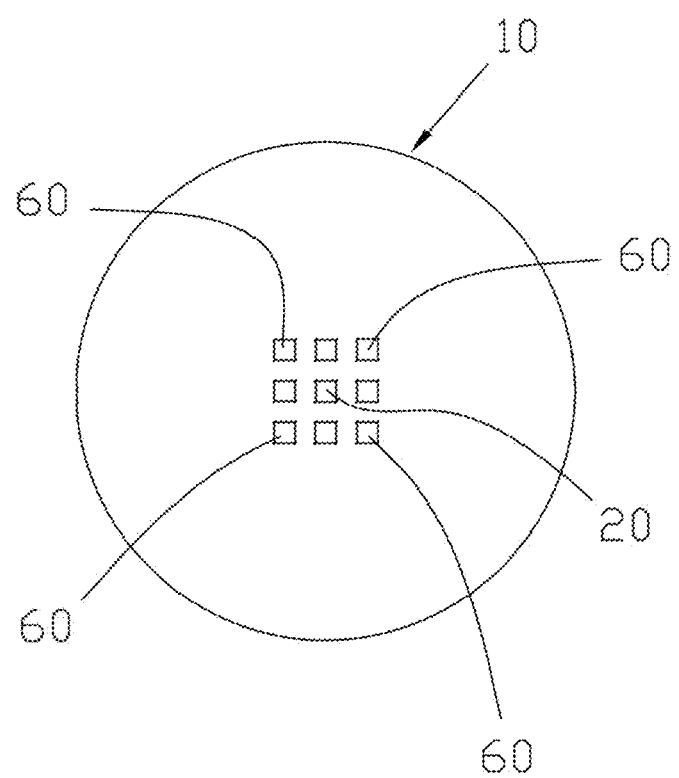
FIG. 9 is a schematic view of light arrangement that a first light source and a plurality of the second light sources are opposite to the optical element.
Figure 10:
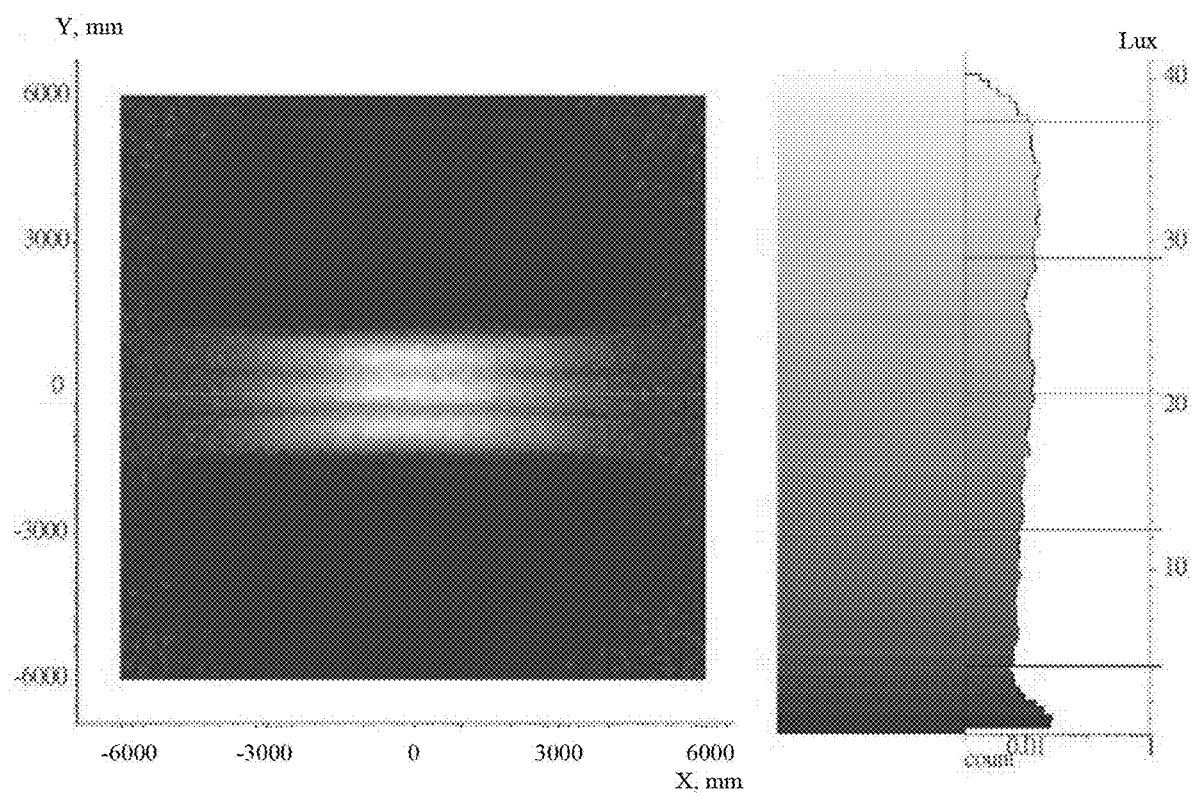
FIG. 10 is a drawing of light distribution pattern that a first light source and a plural of the second light sources are in matrix formation and opposite to the optical element.

In FIG. 9, this embodiment includes a plurality of second light sources 60 arranged in a matrix formation with the first light source 20. FIG. 10 is still a light distribution pattern of the first light source 20 and the second light source 60 opposite to the optical element 10 in reference to the FIG. 9. The light distribution pattern is evidently wider in length and taller in height than it is in the FIGS. 5 and 6. Besides, each of the second light source 60 can be switched on/off by a suitable electronic circuit per the requirement.

Figure 11:
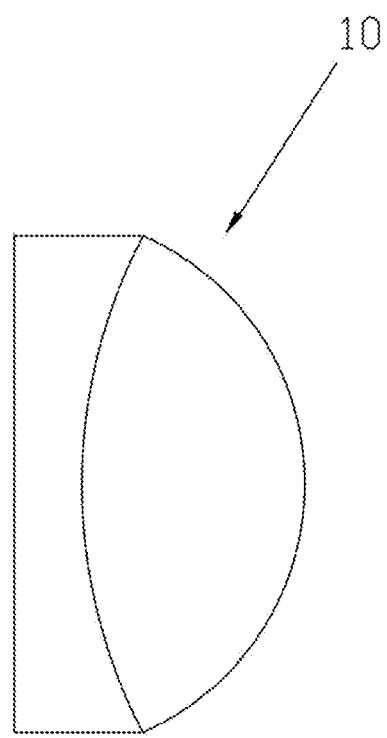
FIG. 11 is a schematic view that the optical element is a Plano-convex lens in present invention.

In FIGS. 1, 2 and 4, the optical element 10 is a lenticular lens having at least one asymmetry configuration on one side. In FIG. 11, the optical element 10 may as well be a Plano-convex lens deployed with a first anamorphic sphere or a second anamorphic sphere as mentioned before.

This invention is configured with a single lens and a single light source which is capable of complying with the protocol of the bicycle lamp and illuminating effect. Therefore, it has merits of simplified structure and low manufacturing cost. Furthermore, as the devise of primary optical projection, the present invention can achieve the target of minimum elements requirement, a downsized volume and low light energy consumption.

The abovementioned embodiments are only to exemplify, not limit, the technique and the performance of the present invention, and anyone skilled in the arts may alter or amend the embodiments per the circumstances without violating the principle and the spirit of the present invention. Therefore, the scope of right protection shall be as described claims later.

What is claimed is:

1. An optical lighting device of vehicles for projecting light on a predetermined area comprises:
   an optical element, having a light incident surface, and a light emitting surface opposite to the light incident surface, wherein at least either of the light incident surface or the light emitting surface includes a first anamorphic asphere; and
   a first light source having a square shape and projecting ray directly into the light incident surface, by a refraction of the first anamorphic asphere, then transmitting out of the light emitting surface and forming a light distribution pattern at the predetermined area,
   wherein the first anamorphic asphere and its relative X-Y-Z coordination satisfies the following formula:

$$z = \frac{c_x x^2 + c_y y^2}{1 + \sqrt{1 - (1+k_x)c^2_x x^2 - (1+k_y)c^2_y y^2}} + \sum_{n=2}^{10} A_{2n}[(1 - B_{2n})x^2 + (1 + B_{2n})y^2]^n$$

wherein $A_{2n}$ is a symmetry coefficient $B_{2n}$ is an asymmetry coefficient $K_x, K_y$ a conic coefficients, and $C_x, C_y$ are curvatures,
   wherein the optical element includes a second anamorphic asphere connected to the first anamorphic asphere, and the X-Y-Z coordination of the second anamorphic asphere satisfies the following formula:

$$z = \frac{c'_x x^2 + c'_y y^2}{1 + \sqrt{1 - (1+k'_x)c'^2_x x^2 - (1+k'_y)c'^2_y y^2}} + \sum_{n=2}^{10} A'_{2n}[(1 - B'_{2n})x^2 + (1 + B'_{2n})y^2]^n$$

wherein the $A'_{2n}$ is a symmetry coefficient, $B'_{2n}$ is asymmetry coefficient, $k'_x, K'_Y$ are conic coefficients, and $C'_x, C'_y$ are curvatures, and wherein the first anamorphic asphere and the second anamorphic asphere occupy the same X-Y-Z coordination, the first anamorphic asphere faces to the Y≥0 direction, and the other anamorphic asphere faces to the Y≤0 direction.

2. An optical lighting device according to claim 1, wherein the corresponding relationship for forming the first anamorphic asphere and the second anamorphic asphere among the symmetry coefficients, the asymmetry coefficients, the conic coefficients and the curvature are $A_{2n}=A'_{2n}$; $B_{2n}=B'_{2n}$; $C_x=C'_x$; $K_x=K'_x$; $C_y \neq C'_y$; $K_y \neq K'_y$.

3. An optical lighting device according to claim 1, wherein the optical element is either a lenticular lens or a plano-convex convex lens.

4. An optical lighting device according to claim 1, includes a second light source deployed on one side of the optical element, opposite to the light incident surface and aligned to the first light source.

5. An optical lighting device according to claim 1, further includes a plurality of the second light sources in a matrix formation with the first light source, and the first light source and the second light sources are arranged on one side of the optical element and opposite to the light incident surface.

6. An optical lighting device according to claim 1, wherein a cut-off line is formed on a fringe of the light distribution area.

\* \* \* \* \*